United States Patent
Karaca et al.

(10) Patent No.: US 8,818,565 B2
(45) Date of Patent: Aug. 26, 2014

(54) SYSTEMS AND METHODS FOR PERFORMING ISLANDING OPERATIONS

(75) Inventors: Erhan Karaca, Schenectady, NY (US); Gerardo Varillas, Greenville, SC (US); Joel Holt, Schenectady, NY (US); David Fischer, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 374 days.

(21) Appl. No.: 13/222,227

(22) Filed: Aug. 31, 2011

(65) Prior Publication Data

US 2013/0054038 A1 Feb. 28, 2013

(51) Int. Cl.
G05D 11/00 (2006.01)
G01R 21/00 (2006.01)

(52) U.S. Cl.
USPC .............................. 700/292; 700/287; 702/60

(58) Field of Classification Search
None
See application file for complete search history.

(56) References Cited

U.S. PATENT DOCUMENTS

| | | | |
|---|---|---|---|
| 5,081,591 A * | 1/1992 | Hanway et al. | 323/205 |
| 5,896,736 A | 4/1999 | Rajamani | |
| 6,164,057 A | 12/2000 | Rowen et al. | |
| 7,376,491 B2 | 5/2008 | Walling et al. | |
| 7,457,688 B2 * | 11/2008 | Szepek et al. | 700/287 |
| 2002/0084786 A1 * | 7/2002 | Egami | 324/503 |
| 2004/0021470 A1 * | 2/2004 | Adams et al. | 324/522 |
| 2004/0178641 A1 * | 9/2004 | Wall | 290/52 |
| 2006/0046107 A1 * | 3/2006 | Lindsey | 429/13 |
| 2007/0093978 A1 * | 4/2007 | Walling et al. | 702/60 |
| 2007/0120538 A1 * | 5/2007 | Sato | 322/45 |
| 2007/0211079 A1 * | 9/2007 | Nixon et al. | 345/619 |
| 2008/0167756 A1 * | 7/2008 | Golden et al. | 700/297 |
| 2008/0232005 A1 * | 9/2008 | Kuehnle et al. | 361/21 |
| 2008/0290666 A1 * | 11/2008 | Bourgeau et al. | 290/40 A |
| 2010/0332857 A1 * | 12/2010 | Vogman | 713/300 |

* cited by examiner

*Primary Examiner* — Sean Shechtman
(74) *Attorney, Agent, or Firm* — Sutherland Asbill & Brennan LLP

(57) ABSTRACT

Systems and methods for performing islanding operations are usable to monitor and collect plant loads and turbine loads of a power plant. Such monitoring and collecting can be used to preemptively determine islanding configurations. According to one embodiment of the invention, a system can be provided. The system can be operable to receive power generation unit information, receive power plant information of the power plant, determine an islanding configuration for the power plant, transmit the islanding configuration to the at least one power generation unit of the power plant, receive breaker status information of at least one breaker coupled to the at least one power generation unit of the power plant and for all breakers connecting power plant to an external grid, and control at least one power generation unit of the power plant.

18 Claims, 3 Drawing Sheets

SYSTEMS AND METHODS FOR PERFORMING ISLANDING OPERATIONS

FIELD OF THE INVENTION

Embodiments of the invention relate generally to islanding operations for power plants, and more specifically for operating gas, steam, and/or combined cycle power plants in islanding mode.

BACKGROUND OF THE INVENTION

Power plants often transition from power generating at any load to independent operation with just internal loads. Independent operation is often described as islanding mode or islanding operations. However, transitioning to islanding mode can be difficult in light of turbine stability, speed of response, and frequency control. In some instances, the transition may cause a plant trip. As such, finding ways to manage plant loads during transitions to islanding mode continues to be a priority.

BRIEF DESCRIPTION OF THE INVENTION

Some or all of the above needs and/or problems may be addressed by certain embodiments of the invention. Disclosed embodiments may include performing islanding operations. According to one embodiment of the invention, there is disclosed a system operable to receive power generation unit information from a unit, receive power plant information from a plant, determine an islanding configuration for the power plant, transmit the islanding configuration to the unit, receive breaker status information of at least one breaker coupled to the unit and for all breakers connected to an external grid, and control at least one unit based on the islanding configuration and the breaker status information.

According to one aspect of the invention, there is disclosed a method for receiving power generation unit information from a unit, receiving power plant information from a plant, determining an islanding configuration for the power plant, transmitting the islanding configuration to the unit, receiving breaker status information of at least one breaker coupled to the unit and for all breakers connected to an external grid, and controlling at least one unit based on the islanding configuration and the breaker status information.

Other embodiments, aspects, and features of the invention will become apparent to those skilled in the art from the following detailed description, the accompanying drawings, and the appended claims.

BRIEF DESCRIPTION OF THE DRAWINGS

The detailed description is set forth with reference to the accompanying figures, which are not necessarily drawn to scale. In the figures, the left-most digit(s) of a reference number identifies the figure in which the reference number first appears. The use of the same reference numbers in different figures indicates similar or identical items.

DETAILED DESCRIPTION OF THE INVENTION

Figure 1:
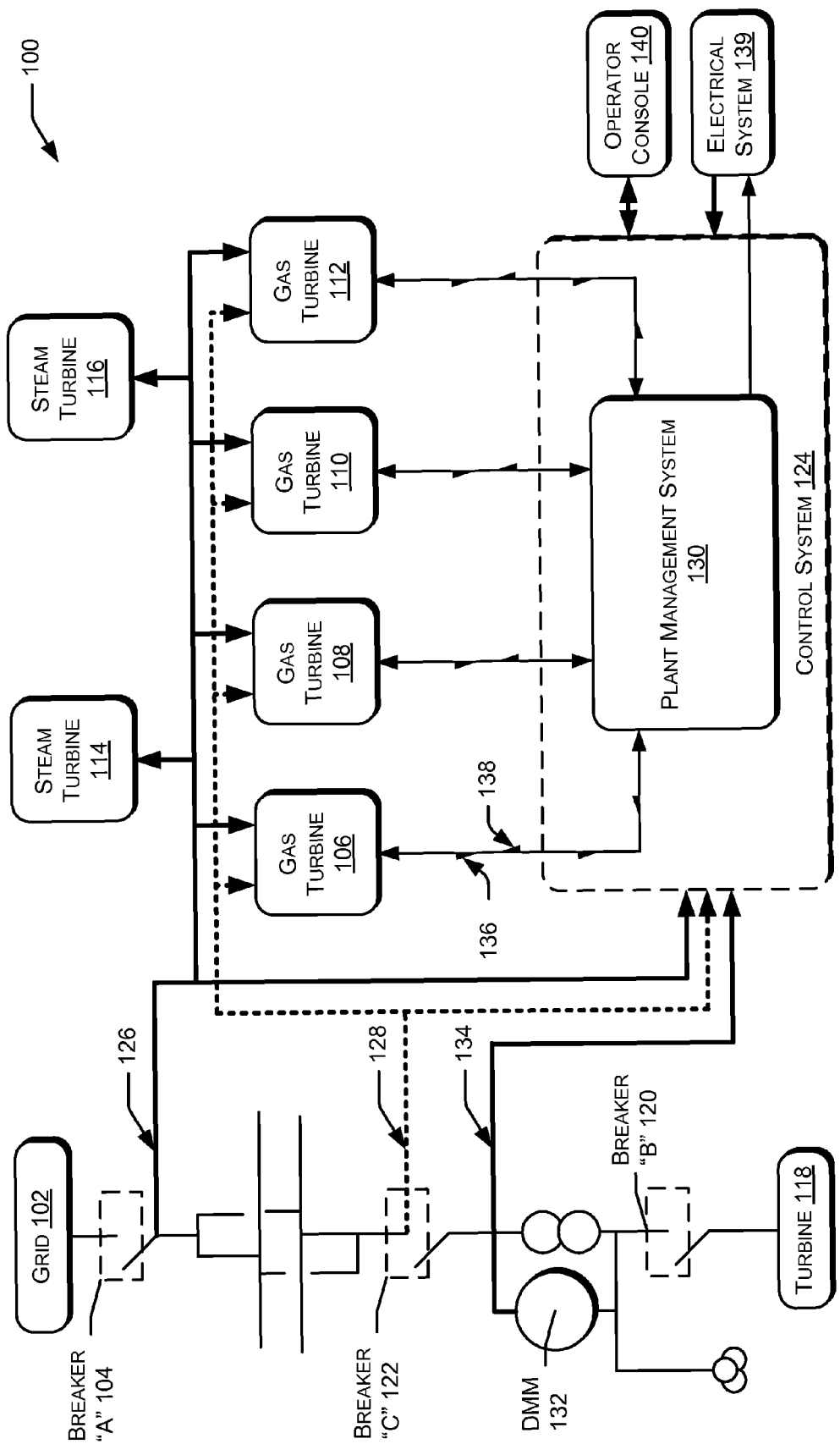
FIG. 1 illustrates a block diagram of an example system for performing islanding operations, according to an illustrative embodiment of the invention.

Illustrative embodiments of the invention will now be described more fully hereinafter with reference to the accompanying drawings, in which some, but not all embodiments of the invention are shown. The invention may be embodied in many different forms and should not be construed as limited to the embodiments set forth herein; rather, these embodiments are provided so that this disclosure will satisfy applicable legal requirements. As noted above, like numbers refer to like elements throughout.

Illustrative embodiments of the invention are directed to, among other things, systems and methods for performing islanding operations. As an overview, islanding operations include, but are not limited to, methods for safely and effectively implementing, or responding to, complete isolation of a power station (or power plant) from the grid. In other words, islanding mode may occur whenever a power plant loses connection to the grid (i.e., an external power source). In some aspects, successful islanding may be effectuated by maximizing the survivability of at least one turbine of the power plant, while opening each individual breaker on all other turbines and instructing each of these other turbines to enter a full speed/no load (FSNL) mode. This may be implemented, in one embodiment, by a power management system to monitor the actual load of each turbine and/or the entire power plant, monitor the projected load in the event of islanding, and designate the turbine most likely to survive a step load to the projected load as a "lifeboat," while instructing all other turbines to go to FSNL or to trip. This system may actively manage/monitor the power plants and respective turbines, such that the chance of power plant survival may be maximized regardless of when the islanding event occurs. In some aspects, under this system, gas turbines may be able to perform step loading and/or load rejection using liquid fuel.

In some aspects, a power plant may be configured with gas turbines, steam turbines, low NOx systems, or combinations of the foregoing, or the like. Additionally, when using both gas and steam turbines, the power plant may be implemented as a combined cycle power plant. In some examples, the power plant may include Dry Low NOx (DLN) systems. These systems may utilize precise fuel scheduling in order to meet emissions levels. Thus, the system may operate in lean combustion modes and may be able to keep in operation and maintain the load required by the system.

The power plant may also be coupled to an external grid, possibly comprising one or more overhead lines (OHLs) for providing power to customers and/or other power plants and/or for receiving power from other power plants. As noted above, however, in some instances, a power plant may lose connection to the external grid. When this occurs, the power plant may attempt to support the plant load with the plant turbines until the connection is restored. In some examples, a monitoring and/or control system may determine, in advance, appropriate turbine actions to achieve a power/load balance within the power plant as quickly as possible. Similarly, upon loss of the power grid, the control system may execute the predetermined actions, thereby transitioning the plant to an islanding mode with minimum risk of loss of power within the plant.

As noted above, a power plant may be a combined cycle power plant. A control system may monitor the gas and steam turbine operations as well as the power consumption of the plant loads. The control system may also provide predetermined target loads for operation of the turbines during an islanding event. The operating modes of the turbines and plant internal loads may be entered into an algorithm that determines a post transition plant configuration with minimal risk of a plant trip (i.e., minimizing the risk of all turbines tripping, thus minimizing the risk of a blackout). This configuration may be continuously determined and distributed to the turbine controls. In some examples, when an islanding event occurs, the controls may instantaneously execute the predetermined actions to transition to an islanding mode.

One such algorithm may determine which gas turbine in the power plant is closest in load to a pre-islanding plant internal load. This gas turbine may be selected as the "lifeboat," or the turbine intended to carry the plant load during the islanding event. In some examples, this may minimize the step change in load requested of the gas turbine and thereby reduce the risk of tripping that turbine. Alternatively, all other turbines of the power plant may be instructed to enter FSNL mode, with the breaker open, which may minimize the overfrequency caused by system inertia as the turbines are ramped down.

FIG. 1 depicts an illustrative power plant 100 in which techniques for performing islanding operations may be implemented. This can apply to a power plant and/or to parts of a power plant in unit and/or block arrangement. In some aspects, the power plant 100 may be connected to an external grid 102 via transmission lines equipped with one or more breakers, such as the "A" breaker 104 shown in FIG. 1. An islanding mode may be defined as the complete isolation of the power plant 100 from the external grid 102 with all of the "A" breakers open. Further, FIG. 1 illustrates one simplified power plant 100 comprising four gas turbines 106, 108, 110, and 112 as well as two steam turbines 114 and 116. However, any number and/or combination of gas and steam turbines may be utilized to implement the power plant 100. Additionally, each of the turbines, both gas and steam, may be connected to a common switchyard bus, or any type of bus for transferring power.

In some aspects, each gas turbine 106-112, or example gas turbine 118, may be connected to the bus via a "B" breaker 120 and a "C" breaker 122. Optionally, each gas turbine 106-112 or 118, may be equipped with an auxiliary transformer downstream or upstream of the "B" breaker 120 and a step-up transformer feeding corresponding power block auxiliary loads. Additionally, the first gas turbine of each block may feed plant common auxiliary loads, and the second gas turbine of each block may feed fuel gas compressor auxiliary loads. Further, in some aspects, the steam turbines 114 or 116 may be connected to the bus via a step-up transformer and a "C" breaker 122, but it may not be equipped with an auxiliary transformer. During normal operation, in some examples, the "A" breakers 104 and gas turbines' "C" breakers 122 may be closed, and the gas turbines may be synchronized to the grid 102 via the "B" breakers 120. In this case, the steam turbines may be synchronized to the grid 102 via the "C" breakers 122.

In some embodiments, an islanding event trigger may be based on the breaker status of the "A" breakers 104. As such, the "A" breakers 104 may be hardwired to a control system 124 as well as each turbine controller; both gas turbines 106-112 and steam turbines 114-116, separately, are indicated by the solid, bold transmission line 126. Additionally, in some aspects, the "C" breakers 122 may be hardwired to the gas turbines 106-112 as well as the control system 124, indicated by the dashed, bold transmission lines 128.

In some embodiments, a plant management system (PMS) 130 may be configured to monitor and/or control the plant operating conditions (e.g., at all times in some aspects) and prepare the plant for islanding operations. In some aspects, the PMS 130 may communicate with each gas turbine 106-112 controller dynamically to gather information and provide instructions for the controllers to execute in an islanding event. The PMS 130 may also be configured to receive general power plant information such as, but not limited to, turbine auxiliary load information, power plant total auxiliary load information, and/or power plant auxiliary load distribution information. The PMS 130 may be integrated as part of the control system 124 as shown in FIG. 1, or it may be separate from the control system 124. Either way, the control system 124 and/or the PMS 130 may actively control one or more of the turbines.

Additionally, in some embodiments, a digital multi-meter (DMM) 132 may be located upstream of auxiliary transformers for each gas turbine, such as gas turbine 118, and/or for each steam turbine, such as steam turbine 114, and may be hardwired to the control system 124 for providing the actual auxiliary load for corresponding auxiliary transformers (e.g., at all times in some aspects), indicated by the solid, bold transmission line 134. Further, a trip function may be added to the steam turbine 114 or 116 controllers based on the status of the "A" breakers 104, because the steam turbines 114 or 116 (if operating) may be tripped in an islanding event. In some aspects, during islanding operations, the steam turbines may be tripped instantaneously, while in some aspects, the steam turbines may be tripped sequentially. The transmission line 134 may also be hardwired, much like the transmission lines 126 and 128, to the control system 124. However, while transmission lines 126, 128, and 134 are shown in FIG. 1 as hardwiring the "A" breaker 104, "C" breaker 122, and DMM 132, respectively, to the control system 124, in some aspects, these transmission lines may actually be hardwired directly to the PMS 130.

In some aspects, the transmission lines connecting the gas turbines 106-112 of FIG. 1 may be bidirectional lines. As such, for example, the transmission line shown between gas turbine 106 and the PMS 130 may comprise a forward transmission direction 136 and a backwards transmission direction 138. The forward transmission direction 136 may be configured to transmit "B" breaker status and/or "C" breaker 122 status for each turbine, as well as turbine information such as turbine output information, and/or operating fuel type information to the PMS 130. The backwards transmission direction 138 may be configured to transmit target load information and/or instructions for the turbine to enter FSNL mode or islanding mode. As noted above, in islanding mode, one predetermined turbine may be instructed to carry the plant load while all other turbines may be instructed to enter FSNL mode.

In some instances, the PMS 130 may continuously monitor the total plant load and the operating status of each gas turbine. The PMS 130 may also calculate the total plant load by summing the auxiliary load of each gas turbine measured by the DMM 132. Additionally, in one non-limiting example, the PMS 130 may issue a ready-to-start permissive to the gas turbines via the transmission lines (e.g., in the backwards transmission direction 138) during the first gas turbine start-up. This permissive, however, may not be valid for subsequent start-ups. For example, the permissive may indicate that the plant house load shall be less than 50 megawatts (MW).

The power plant 100 may also comprise an electrical system 139 for providing power to the power plant, one or more turbines, and/or turbine auxiliary loads. In some aspects, the electrical system 139 may be coupled to the PMS 130 and/or the control system 124 and may be actively controlled by the PMS 130 and/or the control system 124. Also, as noted above, the PMS 130 may determine which turbine should be used to carry the plant load and provide instructions to the gas turbines, such as gas turbines 106-112, for implementing the selection both prior to and during an islanding event. In this way, the islanding operations may be preemptively calculated by the PMS 130 and effectuated instantaneously, or nearly instantaneously, once connection loss to the grid is detected. This information, along with other islanding configuration information and any alarms associated with entering and/or exiting islanding mode, may be transmitted to an operator console 140 coupled to the control system 124 and/or the PMS 130. In some aspects, once the gas turbines are synchronized, the PMS 130 may begin the determination of which turbine should carry the plant load based on operating fuel information and/or turbine output. In one aspect, liquid fuel gas turbines may be excluded. Thus, in this example, if there are no natural gas fuel operating turbines, the PMS 130 may issue an alarm to the operator console 140 that the power plant 100 is not islanding capable.

Additionally, in some aspects, the PMS 130 may compare the output of each turbine to the total plant house load and select a turbine with the output higher than, but closest to, the total plant house load as the islanding lead turbine. This turbine may then be responsible for carrying the plant load. In some examples, the total plant house load may be calculated by summing all individual turbine auxiliary loads and any additional auxiliary loads. Further, in some aspects, the power plant islanding capability may be assessed by comparing the power plant total auxiliary load to a predetermined load setpoint when none of the turbine units are online.

In the event that no turbines match the higher than, but closest to, the total plant house load criteria, then the PMS 130 may select the turbine with the closest output within a predetermined range of the total plant house load. For example, a turbine with output within a range of 25 MW, plus or minus, the total plant house load may be selected. However, if there are no turbines with output within the predetermined range, the PMS 130 may issue an alarm to the operator console 140 to indicate that the plant is not islanding capable. An operator may then either decrease the house load by turning off non-essential house loads, such as air conditioning or the like, or by increasing the turbine outputs. As noted above, the turbines not selected as the "lifeboat" may be instructed to load reject, to enter FSNL mode, to go offline, and/or to enter a no load operating point. Further, in some aspects, the PMS instructions may be communicated dynamically, and continuously, to each turbine to minimize time delay between when the "A" breaker 104 opens and the turbines respond by entering islanding mode. Essential and non-essential house loads may be classified based on predetermined criteria such as, but not limited to, efficiency, need, cost, and/or safety.

In some aspects, as noted above, upon isolation of the plant from the grid (i.e., islanding mode) via opening the "A" breakers 104, the islanding lead turbine (i.e., the one selected to carry the plant load) may load reject (or step) to the total plant house load. Additionally, the remaining operating gas turbines may load reject to FSNL, and the steam turbines may be tripped. Further, the "B" breakers 120 for the islanding lead turbine and the "C" breakers 122 for each gas turbine may remain closed. However, the "C" breakers 122 for the steam turbines may be opened. Once the root cause of the opening of the "A" breakers 104 has been identified and corrected, an islanding restoration process may be conducted by an operator.

The technical effects of certain embodiments of the invention may include providing dynamic assessment of plant conditions and providing solutions for islanding events in advance of their occurrence.

Figure 2:
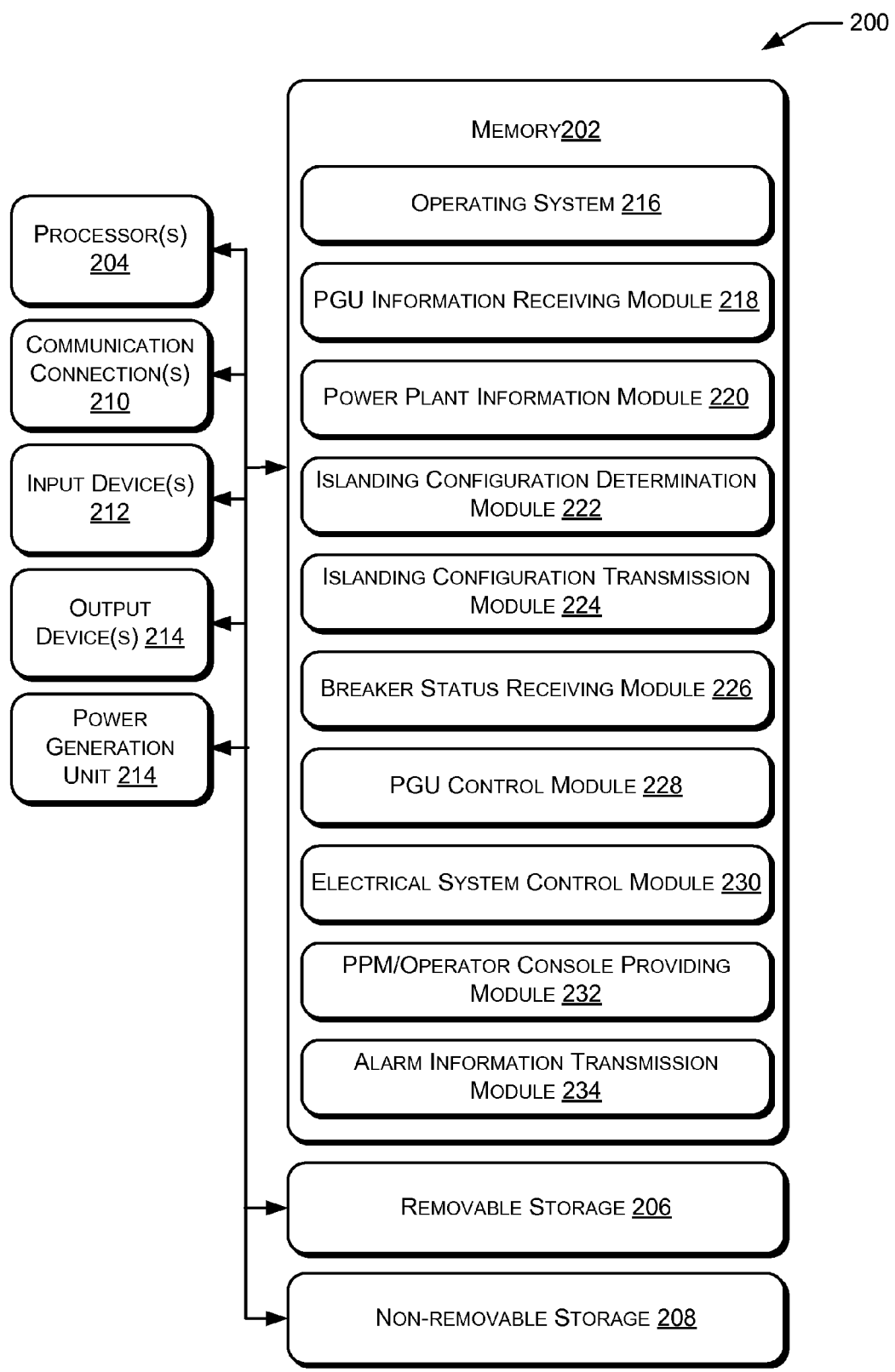
FIG. 2 illustrates a block diagram of an example computing environment showing an illustrative system in which islanding operations may be performed, according to an illustrative embodiment of the invention.

FIG. 2 provides an illustrative overview of one computing environment 200, in which aspects of the invention may be implemented. The computing environment 200 may be configured as any suitable computing device capable of implementing a system for performing islanding operations. By way of example and not limitation, suitable computing devices may include personal computers (PCs), servers, server farms, datacenters, or any other device capable of storing and executing all or part of the power plant 100.

In one illustrative configuration, the computing environment 200 comprises at least a memory 202 and one or more processing units (or processor(s)) 204. The processor(s) 204 may be implemented as appropriate in hardware, software, firmware, or combinations thereof. Software or firmware implementations of the processor(s) 204 may include computer-executable or machine-executable instructions written in any suitable programming language to perform the various functions described.

Memory 202 may store program instructions that are loadable and executable on the processor(s) 204, as well as data generated during the execution of these programs. Depending on the configuration and type of computing environment 200, memory 202 may be volatile (such as random access memory (RAM)) and/or non-volatile (such as read-only memory (ROM), flash memory, etc.). The computing device or server may also include additional removable storage 206 and/or non-removable storage 208 including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 202 may include multiple different types of memory, such as static random access memory (SRAM), dynamic random access memory (DRAM), or ROM.

Memory 202, removable storage 206, and non-removable storage 208 are all examples of computer-readable storage media. For example, computer-readable storage media may include volatile and non-volatile, removable and non-removable media implemented in any method or technology for storage of information such as computer-readable instructions, data structures, program modules, or other data. Memory 202, removable storage 206, and non-removable storage 208 are all examples of computer storage media. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVDs) or other optical storage, magnetic cassettes, magnetic tape, magnetic disk storage or other magnetic storage devices, or any other medium which can be used to store the desired information and which can accessed by the server or other computing device. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The computing environment 200 may also contain communication connection(s) 210 that allow the computing environment 200 to communicate with a stored database, another computing device or server, user terminals such as the operator console 140, and/or other devices on a network, such as the grid 102 of FIG. 1.

The computing environment 200 may also include input device(s) 212 such as a keyboard, mouse, pen, voice input device, touch input device, etc., and output device(s) 214, such as a display, speakers, printer, hardwire, fiberoptic, etc.

Turning to the contents of the memory 202 in more detail, the memory 202 may include an operating system 216 and one or more application programs or services for implementing the features disclosed herein including a power generation unit (PGU) information receiving module 218. The PGU information receiving module 218, as described above, may be configured to receive PGU information from one or more turbines such as, but not limited to, load information, auxiliary load information, fuel type information, and/or associated breaker status information. The memory 202 may also include a power plant information module 220, an islanding configuration determination module 222, and an islanding configuration transmission module 224. In some instances, the power plant information module 220 may receive total plant load and other general power plant information from the turbines, breakers, transformers, and/or other locations of the power plant 100. The islanding configuration determination module 222 may utilize PGU information and power plant information, e.g., from modules 218 and 220, to determine an appropriate islanding configuration in the event that the power plant 100 loses connection with the external grid 102 of FIG. 1. Further, the islanding configuration transmission module 224 may dynamically and continuously transmit these islanding configuration settings to the turbines, breakers, and/or the electrical system 139. In some aspects, any number or combination of the PGU information receiving module 218, the power plant information module 220, the islanding configuration determination module 222 and/or the islanding configuration transmission module 224 may be configured to be operated and/or performed by the PMS 130 and/or the control system 124 of FIG. 1.

The memory 202 may also include a breaker status receiving module 226, a PGU control module 228, and an electrical system control module 230. In some instances, the breaker status receiving module 226 may be configured to receive (in some examples, at all times) the status of each "A" breaker 104, "B" breaker 120 and/or "C" breaker 122 of the power plant 100. Additionally, the PGU control module 228 may be configured to actively control one or more of the turbines based at least in part on the breaker status received by the breaker status receiving module 226. For example, the PGU control module 228 may instruct a turbine to enter a load reject mode, an FSNL mode, an offline mode, or a no load operating point mode based at least in part on an islanding configuration. Further, the electrical system control module 230 may be configured to control and/or receive information from the electrical system 139 of the power plant. As noted above with reference to other modules of the computing environment 200, in some aspects, any number or combination of the breaker status receiving module 226, the PGU control module 228, and/or the electrical system control module 230 may be configured to be operated and/or performed by the PMS 130 and/or the control system 124 of FIG. 1

The memory 202 may also include a power plant management (PPM)/operator console providing module 232 and an alarm information transmission module 234. In some aspects, the PPM/operator console providing module 232 may be configured to provide a power plant management console or controller such as, but not limited to the PMS 130 of FIG. 1. Similarly, the PPM/operator console providing module 232 may also provide an operator console such as, but not limited to, the operator console 140 for receiving and/or displaying alarm information from the PMS 130 and/or the control system 124. In addition, the alarm information transmission module 234 may be configured to transmit alarms and/or other information to the operator console 140 such as, but not limited to, indication of an islanding event, islanding configuration information, breaker status alarms, gas turbine status alarms, general plant alarms, and the like.

Various instructions, methods, and techniques described herein may be considered in the general context of computer-executable instructions, such as program modules, executed by one or more computers or other devices. Generally, program modules include routines, programs, objects, components, data structures, etc., for performing particular tasks or implementing particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on some form of computer-readable storage media.

The example architecture 100 and computing environment 200 shown in FIGS. 1 and 2 are provided by way of example only. Numerous other operating environments, system architectures, and device configurations are possible. Accordingly, embodiments of the present invention should not be construed as being limited to any particular operating environment, system architecture, or device configuration.

Figure 3:
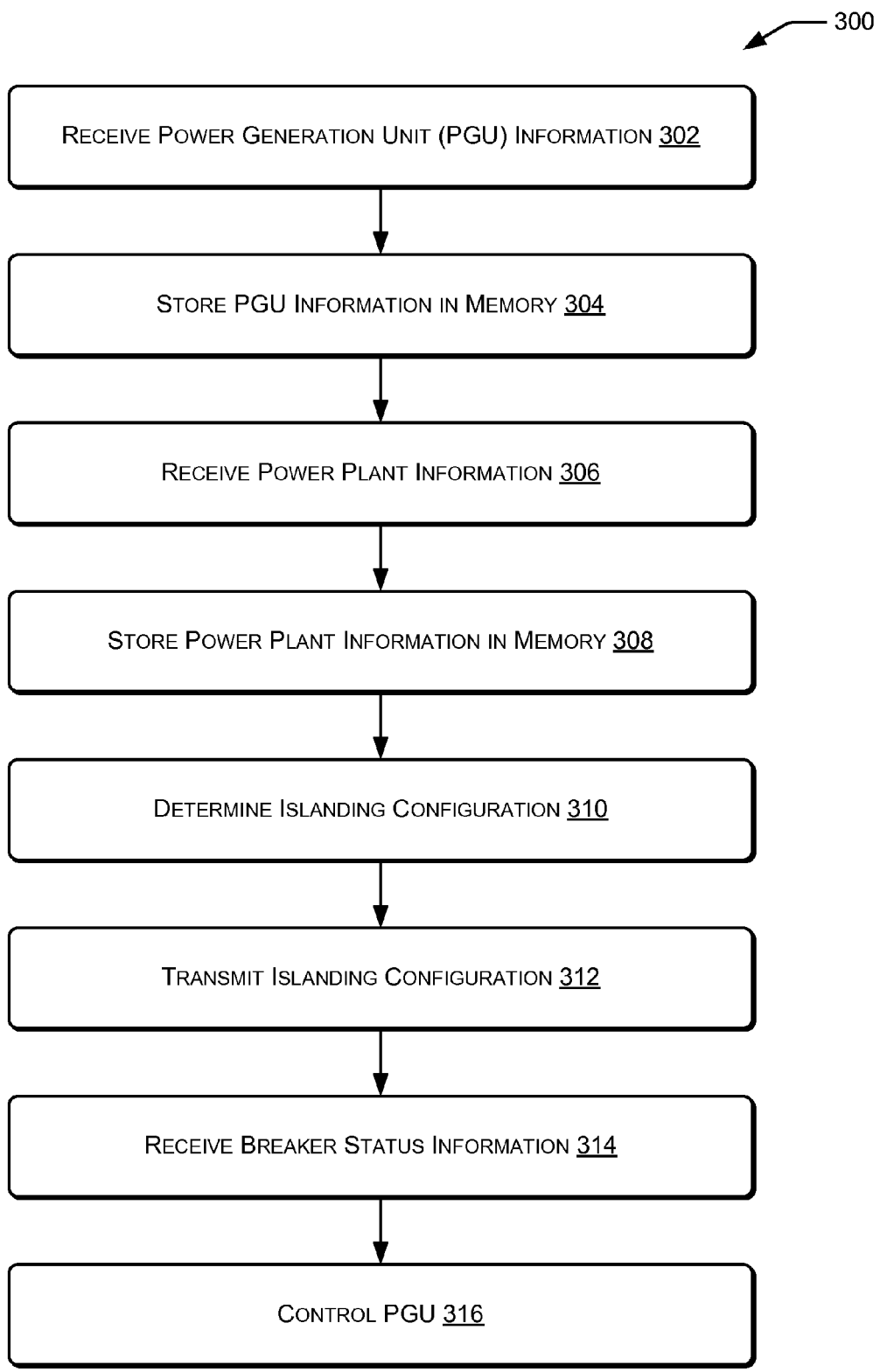
FIG. 3 illustrates a flow diagram of one example method for performing islanding operations, according to an illustrative embodiment of the invention.

FIG. 3 is a flow diagram of illustrative process 300 for performing islanding operations, as described with reference to FIGS. 1 and 2. In one example, the illustrative control system 124, the illustrative PMS 130, or the example computing environment 200 may perform any or all of the operations of process 300. This process is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

In this particular implementation, the process 300 may begin at block 302 in which the process 300 may receive PGU information from a PGU, turbine, or other device associated with providing power such as, but not limited to, the gas turbines 106-112 and/or the steam turbines 114 and 116. At block 304 the process 300 may store the PGU information in a computer-readable memory such as, but not limited to, memory 202. Additionally, the process 300 may receive power plant information at block 306. At block 308, the process 300 may store the power plant information in the same memory, such as memory 202, or in another computer-readable memory of the power plant 100. As noted above, PGU information may include turbine loads, auxiliary loads, breaker status information, and the like. Similarly, power plant information may include total plant load, electrical system information, total load capacity, etc.

The process 300 may then determine an islanding configuration at block 310. In some aspects, the islanding configuration may be based at least in part on the individual PGU information from each turbine received at block 302 and/or the power plant information received at block 306. Additionally, the determination may include selecting a turbine, or other PGU, to carry the total plant load as the "lifeboat" during islanding mode. The determination may also include instructions for all other turbines such as, but not limited to, an instruction to enter FSNL mode.

At block 312, the process 300 may then transmit the islanding configuration to the turbines 106-116, the operator console 140, and/or the electrical system 139. In some aspects, the process 300 is continuously and dynamically performing blocks 310 and 312, such that an optimized islanding configuration is always, and repeatedly, being transmitted to the turbines. In this way, when the status of the breakers indicates an islanding event, the process 300 can implement the islanding operations immediately. At block 314, the process 300 may receive breaker status information. In some aspects, the breaker status transmission lines are hardwired to the control system 124 and/or the PMS 130 such that the breaker status is continuously reported. As such, when the breaker status information indicates an islanding event, as received at block 314, the process 300 may control the PGUs at block 316. Additionally, as noted above, in some aspects, controlling the PGUs includes instructing the turbines to perform the islanding configuration being transmitted at block 312.

Illustrative systems and methods of performing islanding operations are described above. Some or all of these systems and methods may, but need not, be implemented at least partially by an architecture such as that shown in FIGS. 1 and/or 2. It should be understood that certain acts in the methods need not be performed in the order described, may be rearranged, modified, and/or may be omitted entirely, depending on the circumstances. Also, any of the acts described above with respect to any method may be implemented by a processor or other computing device based on instructions stored on one or more computer-readable storage media.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

That which is claimed:

1. A system comprising:
   at least one power generation unit associated with a power plant;
   at least one memory that stores computer-executable instructions; and
   at least one processor configured to access the at least one memory, wherein the at least one processor is configured to execute the computer-executable instructions to:
   receive power generation unit information from the at least one power generation unit, wherein the at least one power generation unit information comprises a power output supplied by the at least one power generation unit;
   receive power plant information of the power plant, wherein the power plant information comprises a power plant total auxiliary load and one or more additional auxiliary loads, and wherein the power plant total auxiliary load and the one or more additional auxiliary loads are classified as essential or non-essential;
   determine, based at least in part on the power generation unit information and the power plant information, an islanding configuration for the power plant by:
   comparing the power output of the at least one power generation unit to the power plant total auxiliary load; and
   selecting the at least one power generation unit for islanding based at least in part on the power output supplied by the at least one power generation unit being outside of a predetermined range and closest to the power plant total auxiliary load, and eliminating the one or more additional auxiliary loads that are non-essential by opening a feed breaker to the additional non-essential auxiliary loads;
   transmit the islanding configuration to the at least one power generation unit of the power plant, wherein the islanding configuration further comprises an alarm information associated with entering and exiting islanding mode;
   receive breaker status information of at least one breaker coupled to the at least one power generation unit of the power plant and for all breakers connecting the power plant to an external grid/load source; and
   control, based at least in part on the islanding configuration and the breaker status information, the at least one power generation unit of the power plant.

2. The system of claim 1, wherein the at least one processor is further configured to execute the computer-executable instructions to control a power plant electrical system, and wherein the power plant electrical system provides power to at least one of the power plant or at least one power generation unit auxiliary load.

3. The system of claim 1, wherein the at least one processor is further configured to execute the computer executable instructions to provide a power plant management system, to provide a power plant operator console, or to control the at least one power generation unit.

4. The system of claim 1, wherein the breaker status information is coupled to a plant management system, a power generation unit controller, and a power plant operator console.

5. The system of claim 1, wherein the at least one power generation unit comprises a steam turbine, a gas turbine, or a gas turbine and a steam turbine coupled as a combined cycle unit.

6. The system of claim 1, wherein the power plant information further comprises power plant operating conditions including at least one of a power generation unit auxiliary load, a power plant total auxiliary load, or a distribution of power plant auxiliary load information.

7. The system of claim 1, wherein the power generation unit information further comprises power generation unit operation conditions including at least one of fuel type information or output information from the at least one power generation unit.

8. A method, comprising:
   receiving power generation unit information from the at least one power generation unit and storing the power generation unit information in at least one memory, wherein the power generation unit information comprises a power output supplied by the at least one power generation unit;
   receiving power plant information of the power plant and storing the power plant information of the power plant in at least one memory, wherein the power plant information comprises a power plant total auxiliary load and one or more additional auxiliary loads, and wherein the power plant total auxiliary load and the one or more additional auxiliary loads are classified as essential or non-essential;

determining, based at least in part on the power generation unit information and the power plant information, an islanding configuration for the power plant, wherein determining the island configuration comprises:

comparing the power output of the at least one power generation unit to the power plant total auxiliary load; and selecting the at least one power generation unit for islanding based at least in part on the power output supplied by the at least one power generation unit being outside of a predetermined range and closest to the power plant auxiliary load, and eliminating the one or more additional auxiliary loads that are non-essential by opening a feed breaker to the one or more non-essential additional auxiliary loads;

transmitting the islanding configuration to the at least one power generation unit of the power plant, wherein the islanding configuration further comprises an alarm information associated with entering and exiting islanding mode;

receiving breaker status information of at least one breaker coupled to the at least one power generation unit of the power plant and for all breakers connecting the power plant to an external grid/load source; and controlling, based at least in part on the islanding configuration and the breaker status information, the at least one power generation unit of the power plant.

9. The method of claim 8, wherein the power generation unit information further comprises power generation unit operating conditions including at least one of fuel type information or additional output information from the at least one power generation unit.

10. The method of claim 8, wherein the power plant information further comprises power plant operating conditions including at least one of power generation unit auxiliary load information, power plant total auxiliary load information, or power plant auxiliary load distribution information.

11. The method of claim 8, wherein the power plant total auxiliary load is calculated by adding all individual power generation unit auxiliary loads and the one or more additional auxiliary loads, and wherein the power plant total auxiliary load and the one or more additional auxiliary loads are classified as essential or non-essential based at least in part on predetermined criteria.

12. The method of claim 8, wherein the power plant islanding configuration is further determined based at least in part by comparing the power plant total auxiliary load to a predetermined load setpoint when none of the power generation units are online.

13. The method of claim 8, wherein the power plant islanding configuration is further determined based at least in part on a power generation unit operating fuel selection, and wherein the power plant islanding configuration is further determined by overriding a selection of an islanding unit based at least in part on the power generation unit operator fuel selection criteria when there are no other power generation units satisfying the selection criteria.

14. The method of claim 8, wherein the power plant islanding configuration is further based on the output of the at least one power generation unit for islanding being closest to a power plant auxiliary load when a particular islanding power generation unit output is within a predetermined range to the power plant total auxiliary load and there are no power generation units with outputs higher than the power plant total auxiliary load.

15. The method of claim 8, wherein the power plant islanding configuration is transmitted continuously to all power generation units.

16. The method of claim 8, wherein a selected power generation unit is communicated instructions to be a power generation unit for islanding and an islanding target output and a remainder of operating power generation units are instructed to trip offline or to operate at a no load operating point.

17. The method of claim 8, wherein each of the at least one power generation unit is communicated corresponding individual power generation unit auxiliary load as individual power generation unit islanding target load.

18. The method of claim 8, wherein the power plant islanding configuration instructions are executed by all power generation units upon receiving breaker status information for each of at least one breaker coupled to each of at least one power generation units of the power plant and for all breakers connecting the power plant to an external grid/load source.

* * * * *

UNITED STATES PATENT AND TRADEMARK OFFICE
CERTIFICATE OF CORRECTION

| | | |
|---|---|---|
| PATENT NO. | : 8,818,565 B2 | Page 1 of 1 |
| APPLICATION NO. | : 13/222227 | |
| DATED | : August 26, 2014 | |
| INVENTOR(S) | : Karaca et al. | |

It is certified that error appears in the above-identified patent and that said Letters Patent is hereby corrected as shown below:

In the Specification

In Column 7, Line 63, delete "FIG. 1" and insert -- FIG. 1. --, therefor.

Signed and Sealed this
Twenty-sixth Day of January, 2016

Michelle K. Lee
*Director of the United States Patent and Trademark Office*